March 17, 1970   A. F. MARTIN ET AL   3,500,587
MACHINE FOR GRINDING THE CUTTING EDGE OF A DIE
Filed Jan. 29, 1968
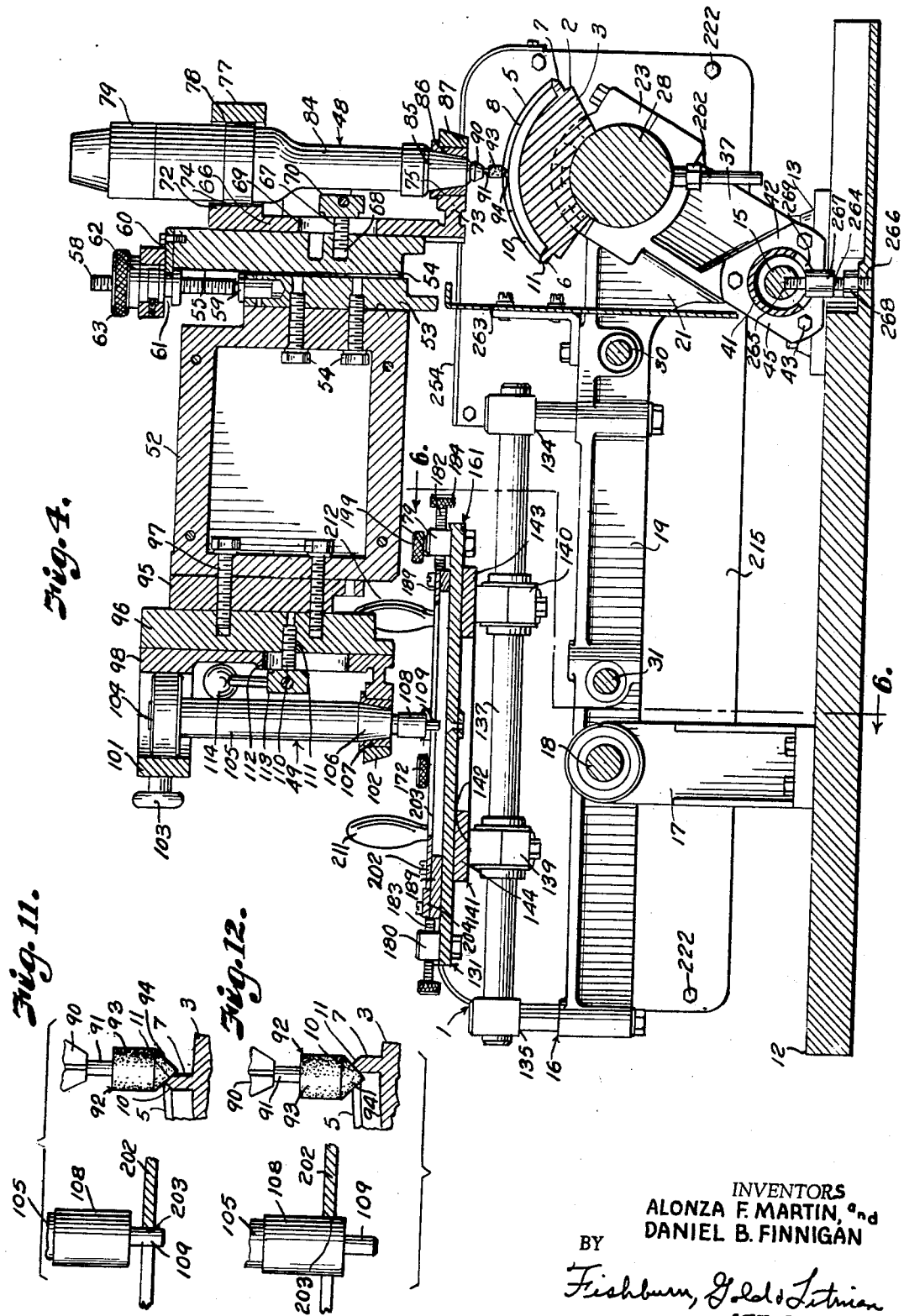
INVENTORS
ALONZA F. MARTIN, and
DANIEL B. FINNIGAN
BY
Fishburn, Gold & Litman
ATTORNEYS

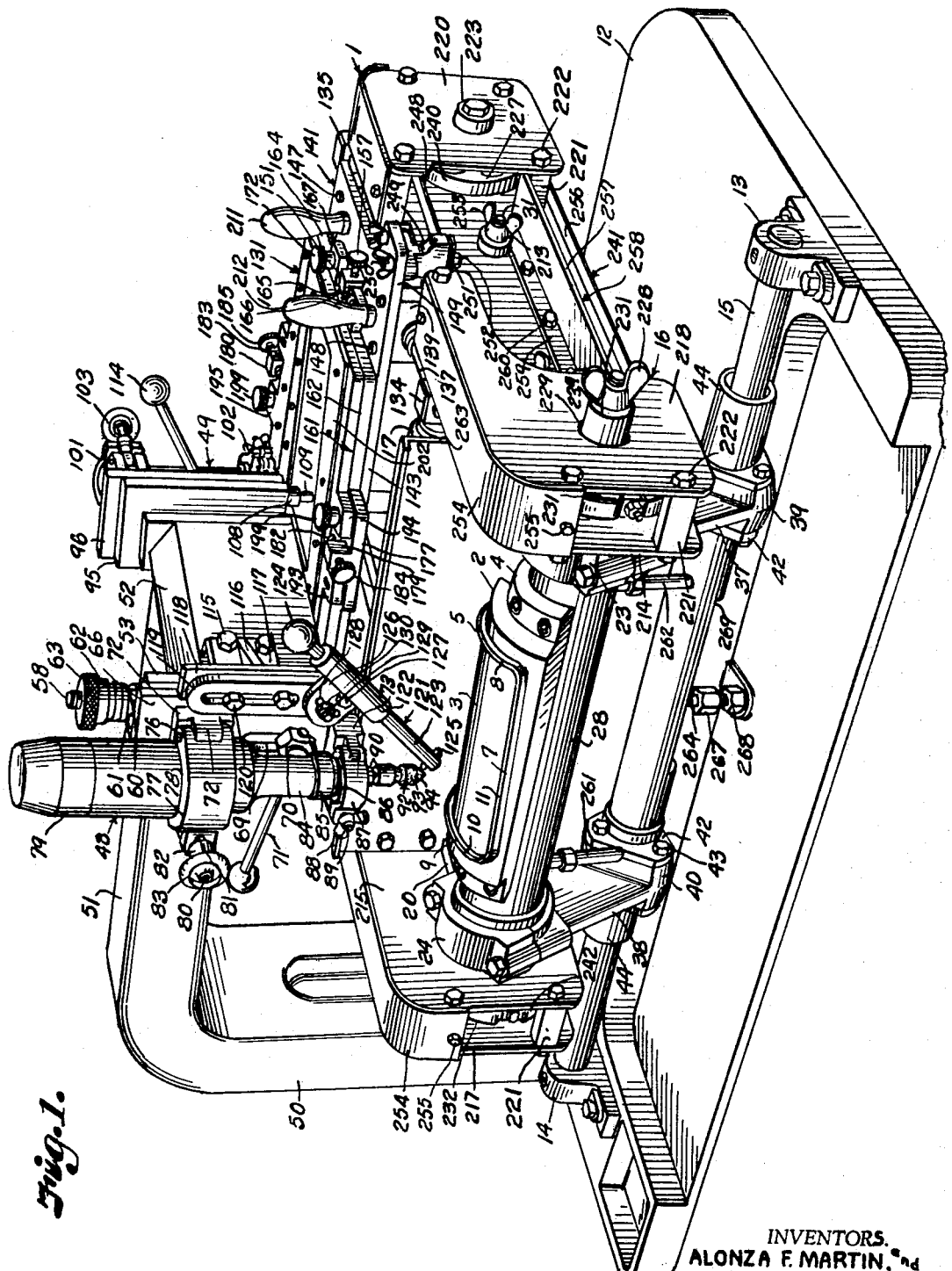

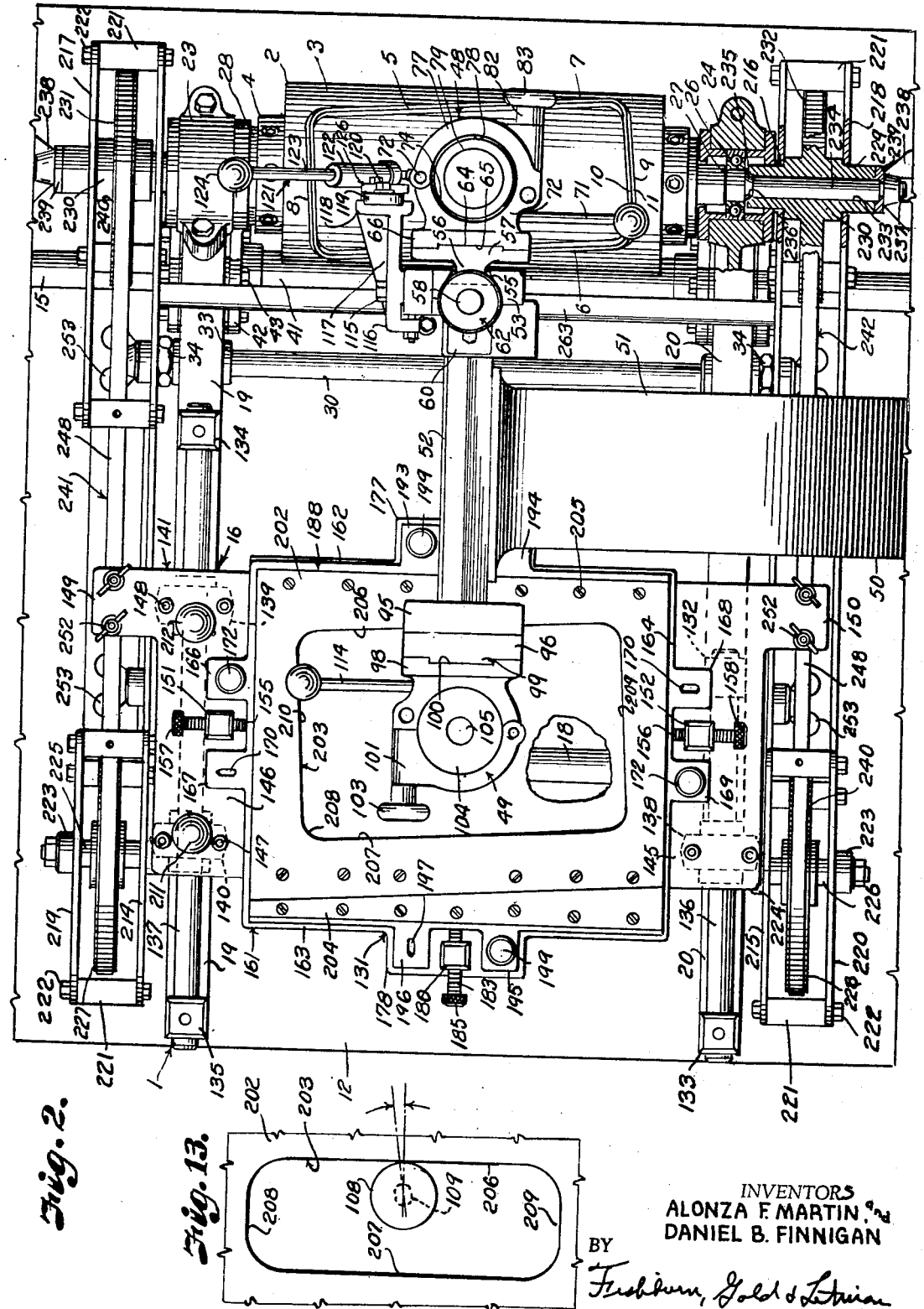

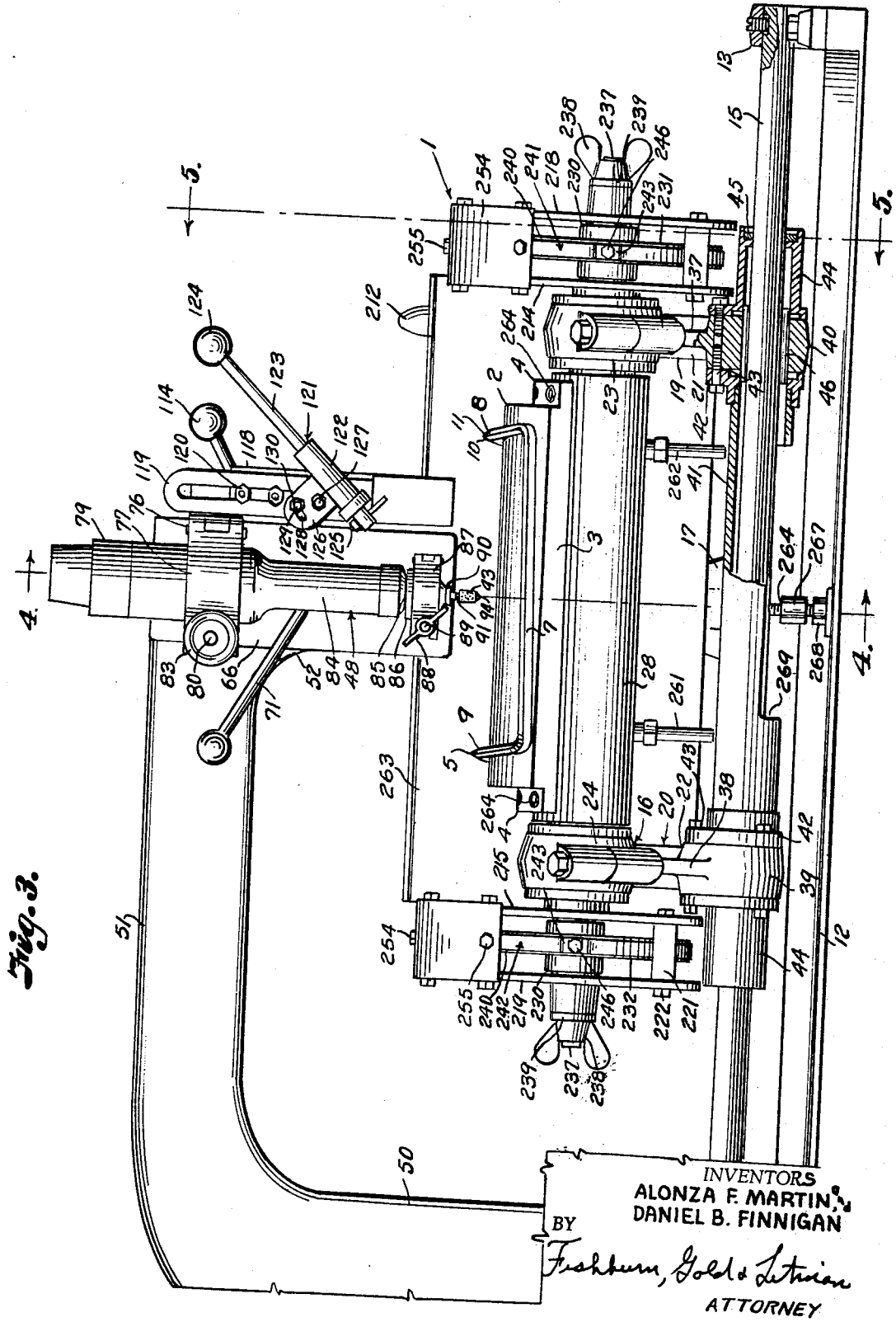

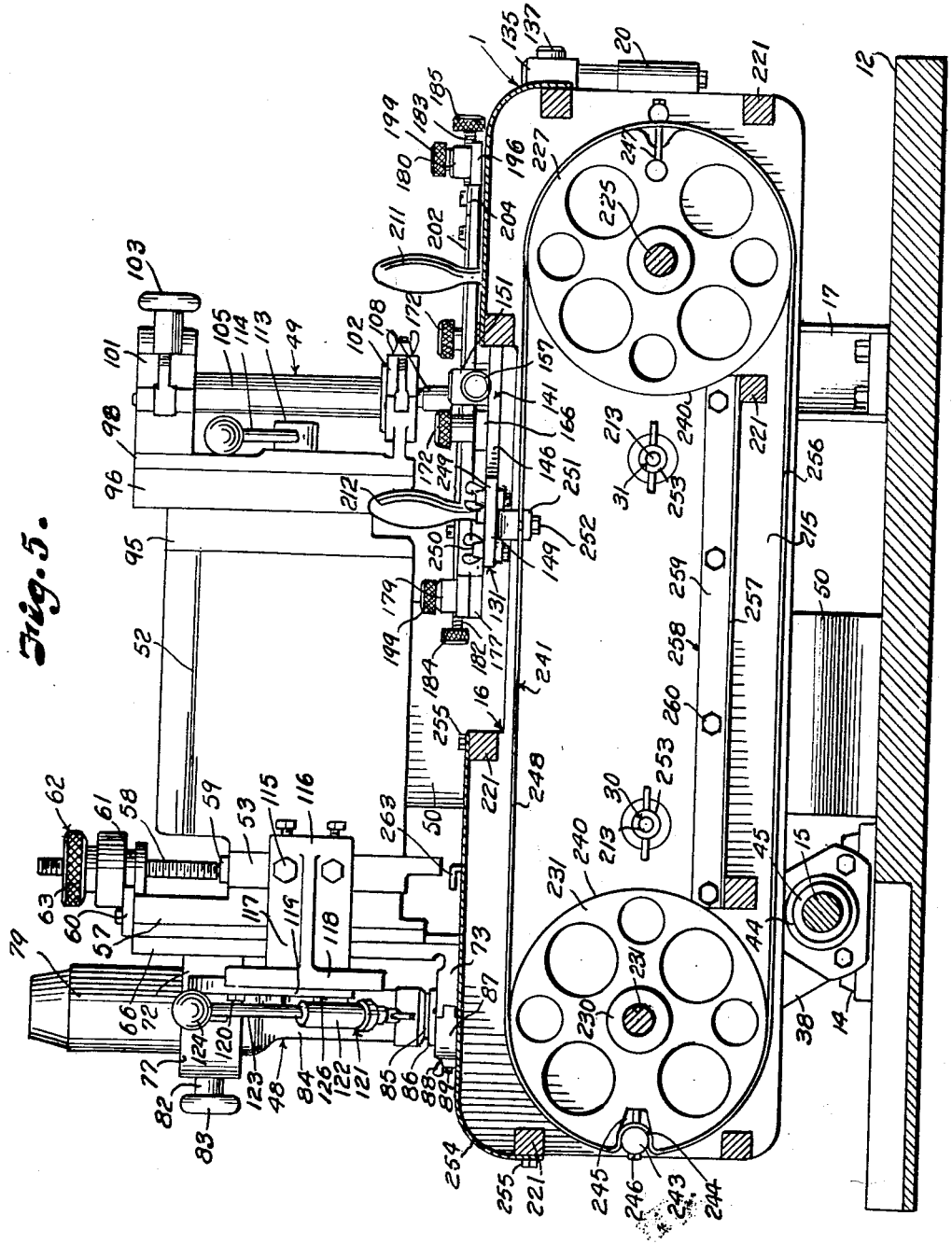

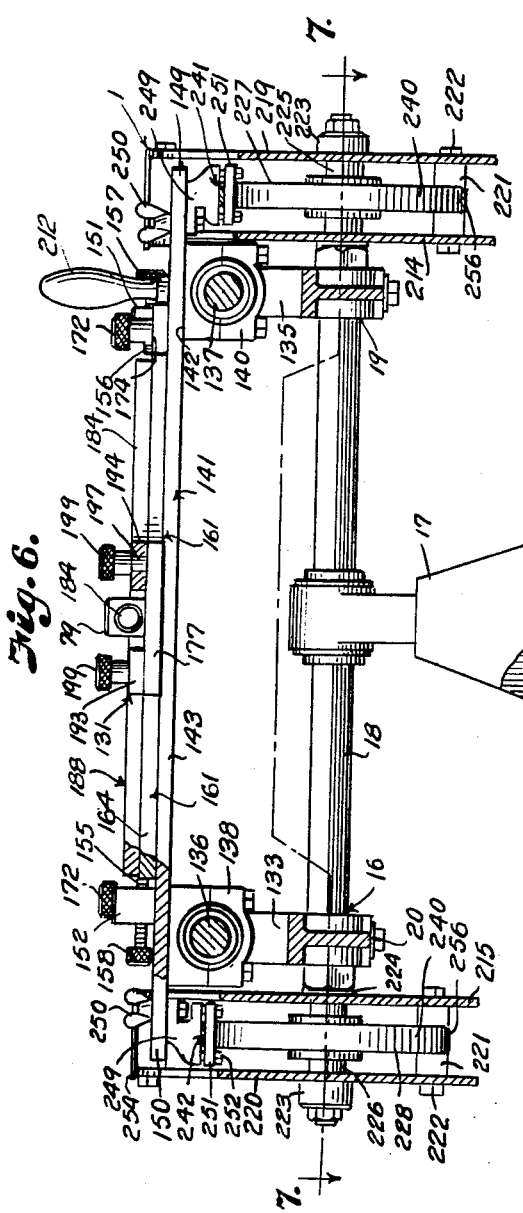
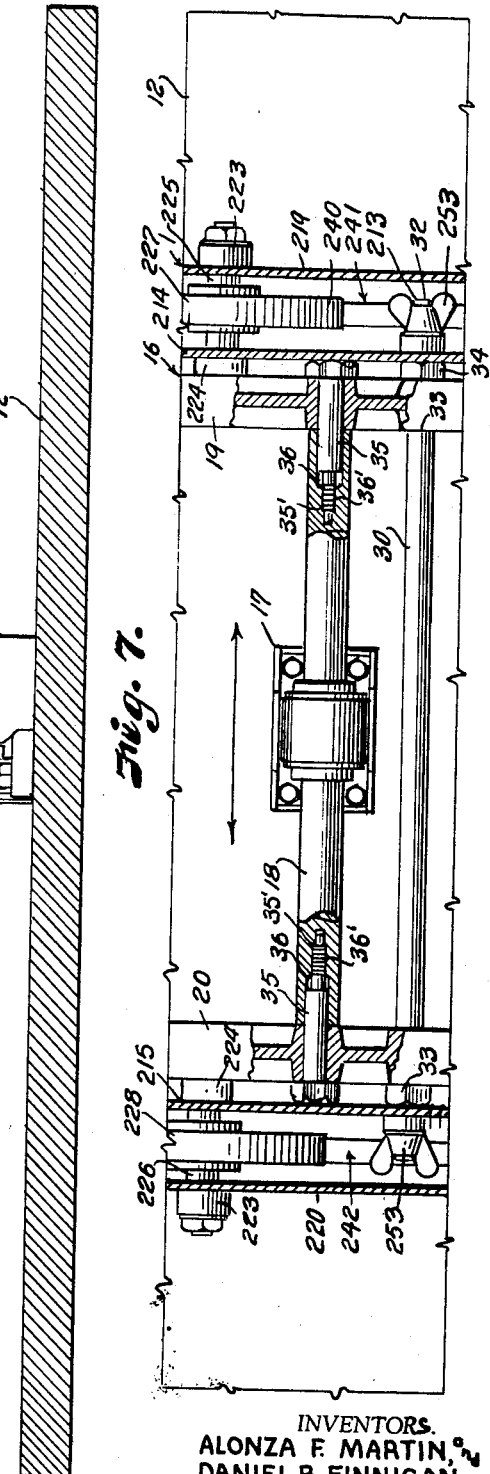

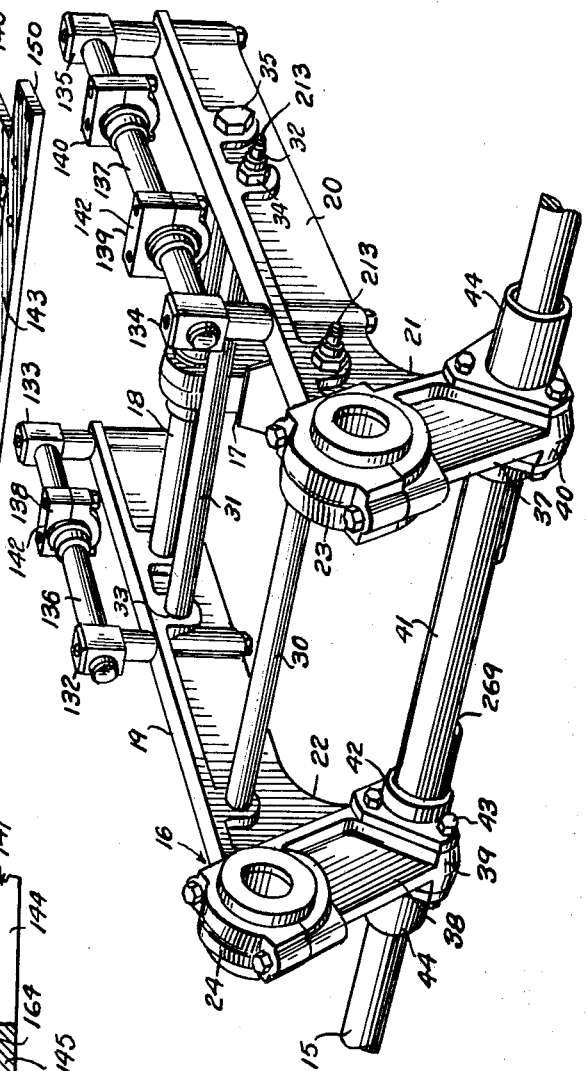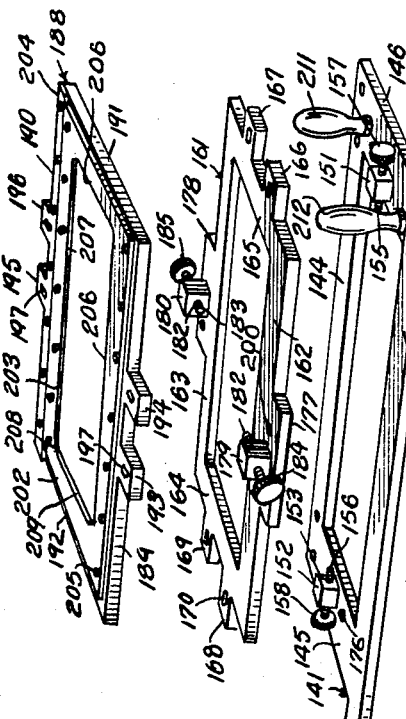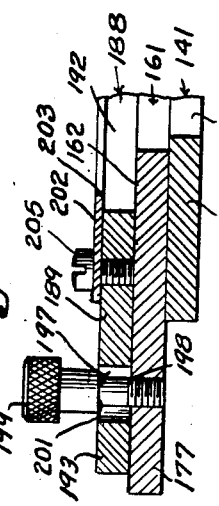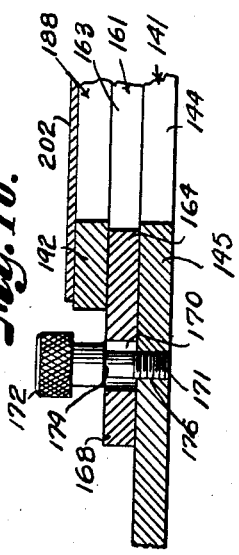

United States Patent Office 3,500,587
Patented Mar. 17, 1970

3,500,587
MACHINE FOR GRINDING THE CUTTING EDGE OF A DIE
Alonza F. Martin and Daniel B. Finnigan, Richmond, Va., assignors to Walbert Equipment Company, Kansas City, Mo., a corporation of Missouri
Filed Jan. 29, 1968, Ser. No. 701,429
Int. Cl. B24b 17/02
U.S. Cl. 51—100     15 Claims

ABSTRACT OF THE DISCLOSURE

A rotary cutting die edge grinder is constructed to use a flat template as a tracing guide, the template being mounted on a base arranged to move with the die in a direction parallel to the die axis and causes rotary oscillation of the die about its axis when moved in a direction normal to the die axis.

---

The present invention is an improvement on the machine illustrated and described in United States Patent No. 3,290,829, issued Dec. 13, 1966, entitled "Machine for Grinding the Cutting Edge of a Die." The machine of the patent employs an oscillatable and longitudinally movable die support that is manipulated by actuation of tracing elements in accordance with a curved template. Such templates are difficult to make of the required precision. Moreover, it is difficult to bring tracing elements of different diameters into full contact with the marginal edges of the template, as when shaping the inner and outer faces of a cutting die. For this reason, the machine of the present invention is constructed to use plane or flat templates, in which the exact contour of the template is easily made to provide precision grinding of the inner and outer contours which form the cutting edges of such dies.

Therefore, the principal object of the invention is to provide a machine that utilizes a flat template.

Other objects of the present invention are to provide a more rigid and sturdy machine, to provide for stationary support of the tracer and grinding units in cooperation with a movable carriage which movably supports both the flat template and the die support, to provide means on the machine for shaping the grinding face of the grinding element in accordance with the angles to which the inner and outer surfaces of the cutting edges of the die are to be ground, to provide a machine capable of milling the cutting edges of a new cutting die using an existing template, and milling, and grinding a template by tracing an existing panel cutting knife, and to provide a machine capable of grinding with precision semicircular cutters as well as straight cutters used in making the semicircular ends and straight sides of a window in an envelope.

It is also an object of the invention to provide a machine in which the movement of the die support and template have a one-to-one ratio.

In accomplishing these and other objects of the invention, as hereinafter described, improved structure has been provided, the preferred form of which is illustrated in the accompanying drawings, wherein:

FIG. 1 is a perspective view illustrating the machine of the machine of the present invention.

FIG. 2 is a plan view of the machine.

FIG. 3 is a front elevational view of the machine, with a part shown in section to better illustrate the front mounting of the carriage that carries the template and die support.

FIG. 4 is a section from the front to the rear of the machine, taken on the line 4—4 of FIG. 3.

FIG. 5 is a similar section taken on the line 5—5 of FIG. 3, particularly illustrating one of the tape connections between the template mounting plates and the oscillatable cylinder that carries the die.

FIG. 6 is a section on the line 6—6 of FIG. 4, particularly illustrating the rear mounting of the carriage.

FIG. 7 is a partial horizontal section showing the rear mounting for the carriage, the section being taken on the line 7—7 of FIG. 6.

FIG. 8 is a perspective view of the carriage with the die cylinder carriage removed, and showing the template mounting and positioning frames in disassembled spaced apart relation relatively to their seat on the carriage.

FIG. 9 is a fragmentary section through the mounting and positioning frame assembly at one of the clamps that secures the template mounting frame to the frame that positions the template to and from the die in the longitudinal direction of the carriage.

FIG. 10 is a similar view at one of the clamps for adjusting the template carrying frame in a transverse direction relative to the first direction.

FIG. 11 is a diagrammatic view illustrating the template follower and grinding element for grinding the inner contour of the cutting edge of a die.

FIG. 12 is a similar view of the follower for grinding the outer contour of the cutting edge of the die.

FIG. 13 is a somewhat diagrammatic view of a template for one shape of cutter and showing the shape of followers for that particular template.

Referring more in detail to the drawings:

1 designates a grinding machine constructed in accordance with the present invention for grinding the inner and outer contours of a rotary die 2, such as used in cutting openings through envelope material in an envelope making machine. Such dies, for example, the one illustrated on the machine 1 in FIGS. 1, 2, 3 and 4, comprise a saddle plate 3 of arcuate cross section to fit the cutting roller of a rotary envelope making machine (not shown), and which is secured by end flanges 4 of the saddle by fastening devices that extend through openings in the flanges and into threaded openings of the cutting roller, also not shown, but which is well known to those skilled in the art of making envelopes. The outer arcuate face of the saddle carries the cutting edges or edge 5, which may be of any shape, but is usually designed to cut somewhat generally rectangular openings in the paper material, for example, the openings that provide windows in the envelopes, in which case the cutting edge comprises spaced apart parallel cutting edge portions 6 and 7, usually arranged at a slight angle to the longitudinal axis of the roller on which the saddle is mounted, and which edge portions 6 and 7 round into parallel end cutting edge portions 8 and 9. The cutting edges may be continuous or formed as segments suitably attached to the saddle. The inner and outer contours 10 and 11, as shown in FIGS. 11 and 12, converge to form the cutting edge 5.

The grinding machine 1 of the present invention includes a generally flat rectangular base 12 having sufficient weight therein to be stable when the machine is in use. Spaced apart along sides of the base near the front end thereof are bearing brackets 13 and 14 for rigidly mounting the ends of a fixed shaft 15 that provides the front support for a carriage 16, later to be described. Mounted near the rear of the base is a single bracket 17 in which a shaft 18 slides in parallel relation with the shaft 15. The bearing bracket 17 is preferably higher than the bearing brackets 13 and 14, as shown in FIG. 4.

The carriage 16 includes spaced apart side frames 19 and 20 that are generally longitudinal and carry at the forward ends 21 and 22 thereof bearing brackets 23 and 24 that retain antifriction bearings 26 (FIG. 2) rotatably journaling spindles 27 on the ends of a cylinder 28, to which a rotary die 2, to be sharpened, it attached, as later described. The cylinder thus has rotatable support on its own axis, but is retained from endwise play relative to the side frames of the carriage by the bearings 26. The side frames of the carriage are rigidly retained in spaced apart relation by the shaft 18 and by tie rods 30 and 31. The rods 30 and 31 have reduced ends 32 which provide shoulders 33 in abutting engagement with sides of the carriage frames when the reduced ends 32 are inserted through the frames. The ends 32 mount nuts 34 that draw the side frames against the shoulders 33. The ends of the shaft 18 abut against the side frames (FIG. 7) and are secured by bolts 35 extending into bores 36 in the ends of the shaft to axially align the shaft 18. The bolts have threaded terminals 35' screwed into threaded sockets 36' in the shaft 18 at the ends of the bores 36.

As above mentioned, the shaft 18 at the rear of the carriage is slidably carried in the single bearing bracket 17, and, in order to support the carriage level, the front of the carriage has arms 37 and 38 depending therefrom to carry bearing collars 39 and 40, as best shown in FIG. 3. The bearing collars 39 and 40 are rigidly connected in spaced relation by a sleeve 41 carrying flanges 42 that are secured to the inwardly facing sides of the collars 39 and 40 by fastening devices such as cap screws 43. Similarly fixed to the opposite sides of the bearing collars 39 and 40 (FIG. 3) are tubular stub housings 44 carrying dust seals 45. The collars 39 and 40 house antifriction bearing sleeves 46 that slide on the shaft 15 (FIG. 3). Thus the front end of the carriage is slidably mounted to reciprocate along the shaft 15, while the shaft 18 is slidable in the single bearing bracket 17, thereby providing a three-point sliding support on which the carriage is smoothly and easily manipulated, as later to be described.

The grinding and tracing mechanisms generally designated 48 and 49, respectively, are supported in fixed position relatively to movement of the die and template. In carrying out this feature of the invention, one side of the base carries a rigid post 50 curving into a laterally extending neck 51 in a head 52. The head 52 is thus located above the carriage 16 and in the longitudinal median plane of the machine. Carried on the side of the head 52 adjacent the cylinder 28 is a face plate 53 that is attached to the head 52 by fastening devices 54. Formed in the outer face of the face plate 53 is a vertical guideway 55, preferably of dovetail cross section as shown in FIG. 2. Slidably mounted in the guideway 55 is a guide rib 56 of similar cross section on a vertical slide block 57. The slide block 57 is thus keyed to the face plate 53, to be raised and lowered by means of a jackscrew shaft 58 having a swivel connection 59 with the upper end of the face plate 53. Fixed to the upper end of the slide block 57 is a plate 60 engaging within an annular groove 61 in a nut 62 having threaded connection with the jackscrew 58. The nut 62 has a knurled head 63 by which the nut may be rotated on the shaft 58 to raise and lower the slide block 57. The slide block 57 also has a vertical guide rib 64 (FIG. 2) that engages in a guide groove 65 of a plate 66. The plate 66 is adjustably positioned on the slide block and clamped in adjusted position by a screw 67 (FIG. 4) engaged in an internally threaded opening 68 of the slide block 57. The outer end of the screw 67 extends through a vertical slot 69 in the plate 66, so that the plate 66 may be clamped in vertically adjusted positions on the slide block by a head 70 on the screw and turned by a laterally extending lever arm 71.

The upper and lower ends of the plate 66 have lateral projections 72 and 73, having, respectively, semicircular seats 74 and 75, with the axis of the seats intersecting and in plane with the axis of the cylinder 28 (see FIG. 4). Fixed to the upper projection by a hinge 76 is a cap 77 having a substantially semicircular seat 78 corresponding to the seat 74, to retain therein a motor unit 79 which is clamped in the seats by a screw 80 hinged to the side of the upper projection 72 that is opposite the hinge 76 and which swings into a slot 81 in the cap 77. The screw 80 carries on the threaded end thereof a nut 82 that is rotated into clamping engagement with the slot 81 of the cap by a hand wheel 83.

The motor unit 79 has a depending neck portion 84 terminating in a conical collar 85 that seats within a conical bushing 86 carried in the seat 75 of the lower projection 73, and which is clamped therein by a hinged cap 87, somewhat similar to the hinged cap 77 previously described, and which is clamped by means of a wing nut 88 on a screw 89 hinged to the projection 73.

The lower end of the motor unit carries a chuck 90 to secure the shank 91 of a grinding element 92, which may be a cylindrically shaped grindstone 93 having a conical lower end 94.

The rear face of the head 52 also carries a plate 95 carrying a face plate 96 which are rigidly connected to the head 52 by fastening devices 97. 98 designates a slide block having a vertical rib 99 that is slidibale in a groove 100 on the plate 96 (see FIG. 2). The plate 96 carries a tracer assembly 49 and includes clamps 101 and 102 at the upper and lower ends thereof. The upper clamp 101 is manipulated by a hand wheel 103 for clamping a collar 104 on the upper end of a vertical staff 105. The lower end of the staff has a conical portion 106 (FIG. 4) that wedges within a bushing 107 retained in the lower clamp 102. The staff 105 projects through the bushing and carries differentially sized upper and lower cylindrical tracers or template followers 108 and 109 fixed thereto.

The plate 98 is fixed in adjusted position on the face plate by a screw 110 threaded into an internally threaded socket 111 of the plate 96 (FIG. 4). The plate 98 has a slot 112 therein for passing the screw 110. The outer end of the screw carries a head 113 which clamps the plate 98 against the face plate and which head carries an operating lever 114.

If desired, one side of the face plate 53 may have fixed thereto by means of screws 115 a bracket 116 that has a forwardly extending arm 117 carrying a vertical plate 118. Slidable vertically on the front of the plate 118 is a slotted bracket 119 adjustably carrying means 121 for shaping the conical end 94 of the grinding element 92. The slotted bracket 119 is retained in fixed position on the plate 118 by cap screws 120.

The shaping assembly 121 includes a sleeve member 122 having adjustable therein a rod 123 provided with a knob 124 on its upper end and a shaper 125 on its lower end. The sleeve 122 is pivotally mounted on the lower end of the slotted plate 119 by an ear 126 rigidly fixed to the sleeve, with a pivot being formed by a cap screw 127 that extends through the ear 126 and into the plate 119. The ear 126 has an arcuate slot 128 passing therethrough a threaded shank 129 that projects from the slotted plate and carries a nut 130 by which the shaper 125 is retained in position while the knob rod 123 is moved to shape the conical end of the grinding element 92 as it is rotated by the motor unit 48.

The carriage 16 which mounts the die carrying cylinder is movably reciprocable on the fixed shaft 15 and bearing bracket arms 37 and 38. Such movement of the carriage 16 bodily moves the cylinder 28 in its axial direction to pass the parallel portions 6 and 7 of the cutting die 2 generally along the grinder element 92, but in order to bring the edges 8 and 9 of the cutting die along the grinder element 92, the cylinder 28 is oscillated on its axis. Such movement is effected by a second carriage 131 that is mounted to move at right angles with respect to the carriage 16, as now to be described.

Rigidly fixed to the side frame 19 of the carriage 16 are pillars 132 and 133. Similarly fixed to the other side frame 20 are similar pillars 134 and 135, with the forward pillar 134 positioned on the frame 20 forwardly of the pillar 132 on the frame 19. Carried by the pillars 132 and 133 are the ends of a stationary guide rod 136. Similarly carried by the pillars 134 and 135 is a guide rod 137, which is of longer length because of the greater spacing of the pillars 134 and 135. The pillars support the guide rods 136 and 137 with their axes in a horizontal plane parallel with the axis of the cylinder 28. Slidable on the guide rod 136 is a bearing block 138. Similarly mounted on the longer guide rod 137 are bearing blocks 139 and 140 to cooperate with the bearing block 138 in providing a three-point sliding support for a generally rectangular frame 141. The bearing blocks 138, 139 and 140 have flat upper faces 142 to seat and support the frame 141 thereon.

The frame 141 includes front and rear transverse rails 143 and 144 connected by side rails 145 and 146 located directly over the guide rods 136 and 137, as best shown in FIG. 6. The bearing blocks 138 and 140 are positioned in lateral alignment and are connected with the rear rail 144 of the frame 141 and in registry with the side rails 145 and 146 by fastening devices 147 (see FIG. 2). The bearing block 139 is located forwardly of the bearing block 140 and is attached to the front rail 143 of the frame 141 by fastening devices 148.

It is thus apparent that the frame 141 has three-point sliding mounting on the guide rods 136 and 137 to reciprocate toward and away from the cylinder 28. Thus the frames of both carriages 16 and 131 have three-point sliding mounting to facilitate ease of movement thereof and eliminate any chance for the frames to stick when moving the cutting edges into contact with the grinding elements, as later described.

Projecting laterally from the sides of the frame 141 in line with the front rail are tongues 149 and 150, for a purpose later to be described. Provided on the side rails 145 and 146 of the frame 141 are lugs 151 and 152 having horizontally aligned internally threaded openings 153 (FIG. 8) for mounting the threaded shanks 155 and 156 (FIGS. 2, 6 and 8) of knurled headed adjusting screws 157 and 158.

Adjustable on the frame 141 to be shifted laterally between the lugs 151 and 152 is a secondary frame 161 having front and rear rail portions 162 and 163 connecting side rail portions 164 and 165. The secondary frame 161 is of a thickness for the outer side faces of the side rail portions to be engaged by the shanks 155 and 156 of the adjusting screws 157 and 158, so that when one of the adjusting screws is tightened and the other loosened, the secondary frame is shifted thereby on the frame 141.

Projecting from the side rail portions of the secondary frame 161 are pairs of ears 166, 167 and 168, 169 (FIGS. 2, 8 and 10), which ears are spaced apart to accommodate the lugs 151 and 152 therebetween. The ears have slots 170 extending in the lateral direction of the frame to pass the threaded shanks 171 of knurled head clamping screws 172. The clamping screws 172 have shoulders 174 (see FIG. 10). When the shank portions 171 of the clamping screws 172 are passed through the slots 170 in the ears, they are threaded into internally threaded openings 176 in the frame 141 to clamp the shoulders 174 against the ears to draw the secondary frame 161 in fixed adjusted position on the frame 141.

Projecting laterally from the front and rear rails of the secondary frame 161 midway between the side rails are flanges 177 and 178 carrying lugs 179 and 180, similar to the lugs 151 and 152. The lugs 179 and 180 also have threaded openings 181 extending in a fore-and-aft direction for mounting the threaded shanks 182 and 183 of knurled headed adjusting screws 184 and 185. The adjusting screws may be turned to position the shanks 182 and 183 against a template carrying frame 188 that seats upon the upper face of the secondary frame 161. The template carrying frame 188 also has front and rear rails 189 and 190 connected by side rails 191 and 192. The rails 189 and 190 of the template carrying frame 188 also have spaced apart ears 193, 194 and 195, 196 that are spaced apart to loosely accommodate the lugs 179 and 180 of the secondary frame therebetween, and in position so that the ends of the threaded shanks of the adjusting screws 184 and 185 bear against the front and rear edges of the template carrying frame, whereby the template carrying frame 188 may be adjusted in a fore-and-aft direction upon the laterally adjustable secondary frame 161. The ears on the template carrying frame also have slots 197 for passing the shanks 198 of knurled headed clamping screws 199 which are threaded into internally threaded openings 200 of the flanges 177 and 178, whereby shoulders 201 of the clamping screws 199 draw the template carrying frame into fixed adjusted position on the secondary frame.

Supported on the rail portions of the template carrying frame 188 is a flat template plate 202 having a track 203 conforming to the shape of the cutting die on the cylinder 28. The rear edge of the template plate is backed by a strip 204. The flat template 202 may be held in flat position against the upper face of the frame 188 by screws 205 (see FIGS. 2 and 8). In the illustrated instance, the track 203 of the template has parallel portions 206 and 207, rounding as at 208 into edges 209 and 210, to be engaged by one or the other of the template followers 108 or 109, as to be later described. The edges 206–210 are, therefore, perpendicular for full tangential contact by the followers 108 or 109.

The frames 141, 161 and 188, when clamped together, are adapted to move as a unit to and from the die cylinder 28, to keep the follower 109 or 108 in contact with the ends of the template tracks when reciprocated on the guide rods 136 and 137. The frame 141 of the carriage has handles 211 and 212 by which the carriage may be manipulated, as later described. An operating connection is provided between the carriage 131 and the die carrying cylinder 28, as now to be described.

Fixed to reduced threaded ends 213 of the tie rods 30 and 31 are plates 214 and 215 having openings 216 registering with the oscillatory axis of the die carrying cylinder 28. The plates 214 and 215 extend rearwardly to adjacent the rearmost pillars 133 and 135, as shown in FIG. 3. Carried at the outer sides of the plates 214 and 215 are somewhat familiar front plates 217 and 218, and rear plates 219 and 220, spaced therefrom by spacers 221 which are connected in assembly with the plates 214 and 215 by means of fastening devices 222 extending through suitable openings in the plate and into threaded sockets in the ends of the spacers. The rear plates 219 and 221, as well as the rear ends of the plates 214 and 215, have bearings 223 and 224 rigidly carried thereby for journaling axles 225 and 226 which carry wheels 227 and 228. The forward ends of the front plates 217 and 218 have openings 229 registering with the openings 216 for mounting the hubs 230 of wheels 231 and 232 that are journaled in the openings 216 and 229 (see FIG. 2). The hubs 230 have axial bores 233 that register with the axis of the spindles 27 of the die cylinder to pass extensions 234. The extensions 234 are of smaller diameter than the trunnions of the spindles 27, to provide conical shoulders 235 to provide clutch engagement with conical counterbores 236 in the inner ends of the hubs. In order to effect and maintain such clutch engagement, the extensions 234 have threaded terminals 237 to mount wing nuts 238 that bear against washers 239, to urge the washers into engagement with the outer ends of the hubs 230 and push the hubs 230 into clutch engagement with the conical faces 233. By this arrangement, the cylinder may be disengaged from the connection with the carriage 131.

The wheels 227, 228, 231 and 232 have flat outer faces 240 carrying thereon endless tapes 241 and 242 which are tensioned over the wheels and fixed to the front wheels by wedges 243, whereby a bight 244 of the tapes is drawn into recesses 245 in the periphery of the wheels by screws 246. The tapes are also fixed to the rear wheels by toggles 247 (FIG. 5). The upper runs 248 of the tapes 241 and 242 are connected to the tongues 149 and 150 on the frame 141 previously described. In the illustrated instance, the under sides of the tongues have brackets 249 secured thereto by fastening devices 250, whereby the brackets extend over the upper face of the upper runs 248 of the tapes, to be clamped thereto by plates 251 engaging the under faces of the upper runs of the tapes and clamped thereto by fastening devices, such as cap screws 252, extending through the plates 251 and threaded into sockets of the brackets 249.

The plates 214 and 215 are retained on the threaded ends of the tie rods 30 and 31 by wing nuts 253.

In FIGS. 1, 3, 5 and 6, it will be noted that the tapes are covered by guards 254 that are secured to certain of the spacers 221 by fastening devices 255. The lower runs 256 of the tapes are covered by flanges 257 and 258 having their other flanges 259 attached to the inner sides of the inner plates 214 and 215 by fastening devices 260 (FIGS. 1 and 5).

The cylinder 28 preferably has handles 261 and 262 projecting from the lower side thereof, to manually oscillate the cylinder when desired (FIG. 1).

The carriage 16 may have a guard plate 263 positioned between the side members 19 and 20, as shown in FIGS. 1, 2 and 4.

In using the machine thus described for sharpening the edge of a cutting die, the cutting die is removed from its cylinder in the envelope making machine, placed on the cylinder 28, and secured thereto by passing fastening devices 264 through the flanges 4 and threading them into the cylinder 28, in the same manner as the die was mounted on the cylinder of the envelope making machine.

A template 202 corresponding to the cutting die is applied to the frame 188 and secured thereto by the screws 205. The frame 188 now carrying the template plate is initially adjusted on the frame 141 of the carriage 131. This initial adjustment is accomplished by loosening all of the clamping screws 172 and 199 and adjusting the screws 184 and 185 so as to position the frame 188 midway between the lugs 179 and 180. The clamping screws 199 are then tightened. A similar adjustment is made by turning the screws 157 and 158 to position the frame 161 midway between the lugs 151 and 152, after which the clamping screws 172 are retightened. All of the frames 188 and 161 are now a rigid unit on the frame 141. Attention is called to the fact that the parallel portions 206 and 207 of the track are substantially parallel with the blade portions 11 and 12 of the die 2, and that the track portions 209 and 210 are substantially parallel with the cutting edges 8 and 9 of the die, however, minor adjustments may be necessary to properly space and align the track portions of the template 202 with respect to the cutting edges of the die.

With the die being fixed on the cylinder 28, further adjustment can be made in the position of the template relatively to the die. The grinding unit 48 is lowered to bring the cone portion 94 of the grind-element 92 into contact, say, with the inner beveled face 10 of the die. This is effected by loosening the screw 110 upon turning of the lever 71. The knurled head 63 is turned to raise or lower the grinding unit to make desired contact of the grinding element with the inner beveled face of the die. When the grinding unit is in proper position, the screw 110 is retightened.

The follower assembly 49 is released upon actuation of the lever 114 to bring the follower 108 into position for moving contact of the track of the template thereagainst, after which the assembly 49 is clamped in fixed position on the template plate 95. The actual contact may be ascertained by grasping the handles 211 and 212 in a cyclic manner to move both carriages 16 and 31 so that the track of the template is moved along the follower 108.

Care must be taken to see that the cam track remains in contact with the follower 108 throughout the generally cyclic movement which is imparted to the template. For example, assuming that the track of the template is moved in a clockwise direction relatively to the follower 108, the carriage 16 will be pushed away from the operator standing in front of the handles 211 and 212, and simultaneously the carriage 31 will be moved on the carriage 16. The carriage 16 moves longitudinally of the shaft 15 and the shaft 18 moves through the bearing bracket 17. The carriage 31 moves on the guide rods 136 and 137 until the edge 210 of the template contacts the follower. The carriage 31 thus moves forwardly in the direction of the cylinder 28 upon the carriage 16, while the carriage 16 has movement in the opposite direction, due to the angular position of the template track. The edge 210 of the template will continue in moving contact with the follower 108 with movement of the carriage 16 toward the operator, movement of the carriage 31 being away from the cylinder until stopped by the edge 207 coming into contact with the follower 108. The operator will then pull the handles 211 and 212 toward him, which pulls the carriage 16 in the same direction and shifts the carriage 31 away from the cylinder 28. When the movements are stopped by the edge coming into contact with the follower 108, pressure is applied to the handles to cause the edge 209 to move along the follower. When movement is stopped by contact of the edge 206 with the follower, the operator again pulls the handles toward him to complete the cycle. Throughout these movements, an axial movement is imparted to the cylinder under movement of the carriage 16, and the movement of the carriage 131 imparts an oscillatory movement of the cylinder 28 on its axis. The oscillatory movement is imparted through the tape connections 241 and 242. Any adjustments found necessary to maintain uniform contact may be accomplished by readjusting the frames 188 and 161 on the frame 141, through manipulation of the adjusting screws 156, 157, 184 and 185.

With the motor 79 in operation, the grinding element will grind an inner bevel on the die blade in accordance with the taper of the conical end 94 of the grinding element 92.

After the inside bevel has been ground, the follower assembly 49 is raised on the face plate 96 so that the follower 108 is moved out of engagement with the track of the template, and the follower 109 is moved into position to engage the track. The grinding assembly is loosened on its supporting plate 96 and raised to lift the grinding element out of the die and then lowered to contact the outer periphery of the cutting edge, with the conical end 94 of the grinding element in position to engage the outer bevel 11, as shown in FIG. 11. Then, with the motor in operation and the moving force applied to the carriages as previously described, the grinding element will grind a corresponding bevel on the outer side to provide a cutting edge at the intersection of the beveled faces 10 and 11.

In some dies and templates therefore, the follower 109 is not always circular; for example, in FIG. 13 the follower 109 is somewhat oval, so that the grinder 93 correctly follows the inner contour 10 of the knife edge 5.

After grinding the die, it is desirable to hone the cutting edge, and this may be effected by disengaging the tape connection from the cylinder 28 by the operator backing off the wing nuts 238 to release the clutch engagement of the hubs 230 with the spindles 227 of the cylinder shaft. The cylinder may now be oscillated freely with respect to a honing jig (not shown) by the operator grasping the handles 261 and 262. After the cutting edge has been smoothed, the die is removed and reapplied to the cylinder of the envelope making machine.

The taper of the coned end 94 of the grinding element 92 may be maintained from time to time by the shaping tool 125. In using the shaping tool, the grinding assembly 48 is secured in a raised position, as illustrated in FIG. 1. The nut 130 is loosened to pivot the rod 123 on the pivot 127 until the rod 123 is at the desired angle, after which the nut 130 is retightened to hold the angle. The fastening devices 120 that secure the slotted plate 119 are loosened and the shaper assembly is positioned to bring the shaper tool 125 into position to engage the cone of the grinding element. The fastening devices 120 are then tightened to hold the angle of the rod 123. By grasping the knob 124 on the rod 123, the rod may be reciprocated in the sleeve 122 to shape the angle of the grinding element while it is being rotated by the motor.

If a new template for an existing die is to be made, the grinding element 92 is replaced in the chuck 90 by a guide pin (not shown) having a coned head provided with an angle, for example, of 90° and of a predetermined diameter. The assembly 48 is then adjusted to bring the cone of the pin into contact with the inner beveled face 10 of the die. The followers 108 and 109 are replaced with a scribe tool (not shown). The blank template plate drilled for the screws 205 is attached to the frame 188. Then with the carriages being moved to hold the inner beveled face 10 against the cone of the guide pin, the template is scribed to the shape of the opening to be cut therein. Of course, the diameter of the guide pin must be such that the scribe makes the mark in the correct place on the template. The marked template is removed and an opening is cut therein along the scribed line, care being taken to leave material to be ground off to the size of the opening. The marked plate is removed and the opening cut out, after which the plate is reapplied to the frame 188 by the screws 205, and the opening is ground to size using a grinding wheel having the diameter of the follower 91. The grinding is controlled by the guide pin tracing the inner bevel of the cutting edge of the die.

Since the diameter of the shaft 15 is more or less limited, it may be desirable to provide a center support for the fixed shaft 15 to enhance rigidity thereof. This is accomplished by means of a turnbuckle 264 that has one end threadedly connected with a socket 265 in the bottom of the shaft 15 and a registering socket 266 in the base. The turnbuckle has a wrench portion 267 midway between the ends thereof to turn the turnbuckle for adjusting alignment of the midportion of the shaft with respect to the ends supported by the bearings 13 and 14. The end of the turnbuckle which is screwed into the base has a nut 268 turnable on the threads of the turnbuckle and to lock the turnbuckle against the base after an adjustment is made.

In order to accommodate the turnbuckle connection with the shaft 15, the sleeve 41 has a slot-like opening 269 extending longitudinally thereof, that is long enough to accommodate the movement of the carriage 16 and wide enough to provide ample clearance at the sides of the turnbuckle (see FIGS. 1, 3, 4 and 8).

What is claimed and desired to be secured by Letters Patent is:

1. A grinding machine for grinding the cutting edge of a rotary die of the type used in cutting openings through paper and like sheet materials while under continuous movement in a rotary envelope making machine, and which die has a cutting edge projecting a uniform radial distance from the axis of rotation of said die, said grinding machine including
    a base,
    a grinding assembly on the base and having a rotary grinding element rotatable upon a substantially vertical axis above the base,
    a tracing assembly spaced laterally from the grinding assembly and having a follower arranged on a vertical axis parallel with the rotational axis of the grinding element,
    means on the base for oscillatably mounting the die on an axis corresponding to its axis of rotation when in use,
    a plane template having a track following the shape of the cutting edge of the die,
    means supporting the template on the base for relative movement with respect to the follower of the tracer assembly in a general direction parallel to said axis of oscillation and also in a generally transverse direction,
    means for producing relative movement between the die and grinding element in accordance with the first described movement of the follower and template,
    and means for producing oscillation of the die responsive to the trasverse movement between the template and follower.

2. A grinding machine as described in claim 1, in which the cutting edge is formed at the intersection of inner and outer level faces, and in which the tracing assembly has two differentially sized followers for respectively contacting the track of the template when grinding said inner and outer bevel faces.

3. A grinding machine as described in claim 1, wherein the means for mounting the die has a wheel connected thereto in the axis of oscillation, a second wheel cooperating with the first to carry an endless tape, and means connected with the tape and responsive to the movement in said generally transverse direction to oscillate the die.

4. A grinding machine as described in claim 1, including means for adjusting the template and its template supporting means to align the track of the template relatively with the cutting edge of the die and its oscillatable mounting.

5. A grinding machine as described in claim 1, in which the grinding and tracing assemblies have stationary support on the base, and the template supporting means and the die mounting means are movably carried on the base.

6. A grinding machine as described in claim 1, and wherein the template supporting means includes superimposed frames with the template being fixed to the upper superimposed frame, means for adjustably positioning the said uppermost frame on the next lower frame to align the template in a direction transversely relatively to the oscillatory cylinder, and means for adjustably positioning the intermediate frame on the template supporting means to align the template in a direction parallel with said cylinder.

7. A grinding machine for grinding the cutting edge of a rotary die of the type used in cutting openings through paper and like sheet materials while under continuous movement in the making of envelopes, and which die has a cutting edge projecting a uniform radial distance from the axis of rotation of a cylinder on which the die is mounted, said grinding machine including
    a base,
    an oscillatory cylinder similar to the cylinder from which the die was removed for grinding for mounting the die in said grinding machine,
    a carriage,
    means mounting the oscillatory cylinder on the carriage for oscillation on the axis of said cylinder,
    means mouting the carriage on the base for reciprocatory movement in a direction longitudinally of said axis of oscillation,
    a secondary carriage for carrying a template having a track substantially corresponding to the cutting edge of the die,
    means mounting the secondary carriage upon the first named carriage for reciprocatory movement to and from the cylinder,
    means connecting the secondary carriage with the cylinder to oscillate said cylinder on its axis of oscillation,
    a grinding assembly rigid with the base and having a rotary grinding element with its axis of rotation intersecting the axis of oscillation for grinding contact with the edge of the die mounted on the oscillatory cylinder, a template tracing assembly rigid with the base and having a track follower to be engaged by the track of the template for limiting movement of said carriages to define the shape of the cutting edge, whereby the cutting edge is kept in grinding contact with the grinding element, and means on the secondary carriage for manipulating the carriages in causing the template track to maintain contact with the follower.

8. A grinding machine as described in claim 7, wherein the mounting means for the first carriage includes
brackets at opposite sides of the base,
a shaft having ends supported by said brackets and on which one end of the carriage is slidably mounted,
and a single bearing bracket on the base and spaced from said shaft for providing a sliding support for the opposite end of said carriage.

9. A grinding machine as described in claim 7, wherein the mounting means for the first carriage includes
brackets at opposite sides of the base,
a fixed shaft having ends supported by said brackets,
and a single bracket on the base and spaced laterally from said shaft,
and wherein the first carriage includes
spaced side frames journaling ends of the cylinder which mounts the cutting die,
bearings at one end of the side frame for slidable mounting on the fixed shaft,
and a shaft connecting the other ends of the side frames and having sliding support in said single bracket to cooperate with said bearings in providing a three-point sliding support for said carriage.

10. A grinding machine as described in claim 7, wherein the said first carriage includes
spaced side frames journaling ends of the cylinder which mounts the cutting die,
and in which the mounting for the secondary carriage includes
a guide rod carried by each side frame,
spaced apart brackets slidable on one guide rod,
a single bracket slidable on the other guide rod,
and a frame mounted on said brackets for carrying the template.

11. A grinding machine as described in claim 7, wherein the mounting means for the first carriage includes
brackets at opposite sides of the base,
a fixed shaft having ends supported by said brackets,
and a single bracket on the base and spaced laterally from said shaft,
and wherein the first carriage includes
spaced side frames journaling ends of the cylinder which mounts the cutting die,
bearings at one end of the side frame for slidable mounting on the fixed shaft,
and a shaft connecting the other ends of the side frames and having sliding support in said single bracket to cooperate with said bearings in providing a three-point sliding support for said carriage,
and in which the mounting for the secondary carriage includes
a guide rod carried by each side frame,
spaced apart brackets slidable on one guide rod,
a single bracket slidable on the other guide rod,
and a frame mounted on the brackets for carrying the template.

12. A grinding machine as described in claim 7, wherein the secondary carriage includes
a frame,
superimposed frames carried upon the first frame,
the template being fixed to the upper of the superimposed frames,
means for adjustably positioning the said uppermost frame on the intermediate frame to align the template in a direction transversely relatively to the oscillatory cylinder,
and means for adjustably positioning the intermediate frame on the first frame of the carriage to align the template in a direction parallel with said cylinder to align the track of the template with the cutting edge of the die.

13. A grinding machine as described in claim 7, wherein the connecting means between the secondary carriage and the oscillatory cylinder includes
wheels connected to ends of the oscillatory cylinder,
similar wheels rotatably mounted at opposite sides of the first named carriage in alignment with the first named wheels,
tapes on peripheries of the aligning wheels,
means anchoring the tapes to the wheels that are connected to the ends of the oscillatory cylinder,
and means for fixing the tapes to the secondary carriage.

14. A grinding machine as described in claim 7, wherein the connecting means between the secondary carriage and the oscillatory cylinder includes clutch means for disconnecting the oscillatory cylinder from the secondary carriage.

15. A grinding machine as described in claim 7, wherein the connecting means between the secondary carriage and the oscillatory cylinder includes
wheels at ends of the oscillatory cylinder,
similar wheels rotatably mounted at opposite sides of the first named carriage in alignment with the first named wheels,
tapes on peripheries of the aligning wheels,
means anchoring the tapes to the wheels that are connected to the ends of the oscillatory cylinder,
means for fixing the tapes to the secondary carriage,
and clutch means connecting the first named wheels to the oscillatory cylinder.

References Cited

UNITED STATES PATENTS

| | | | |
|---|---|---|---|
| 1,424,196 | 8/1922 | Fowler | 51—100 |
| 3,290,829 | 12/1966 | Martin et al. | 51—100 |

OTHELL M. SIMPSON, Primary Examiner

U.S. Cl. X.R.

51—127